United States Patent Office 3,403,756
Patented Oct. 1, 1968

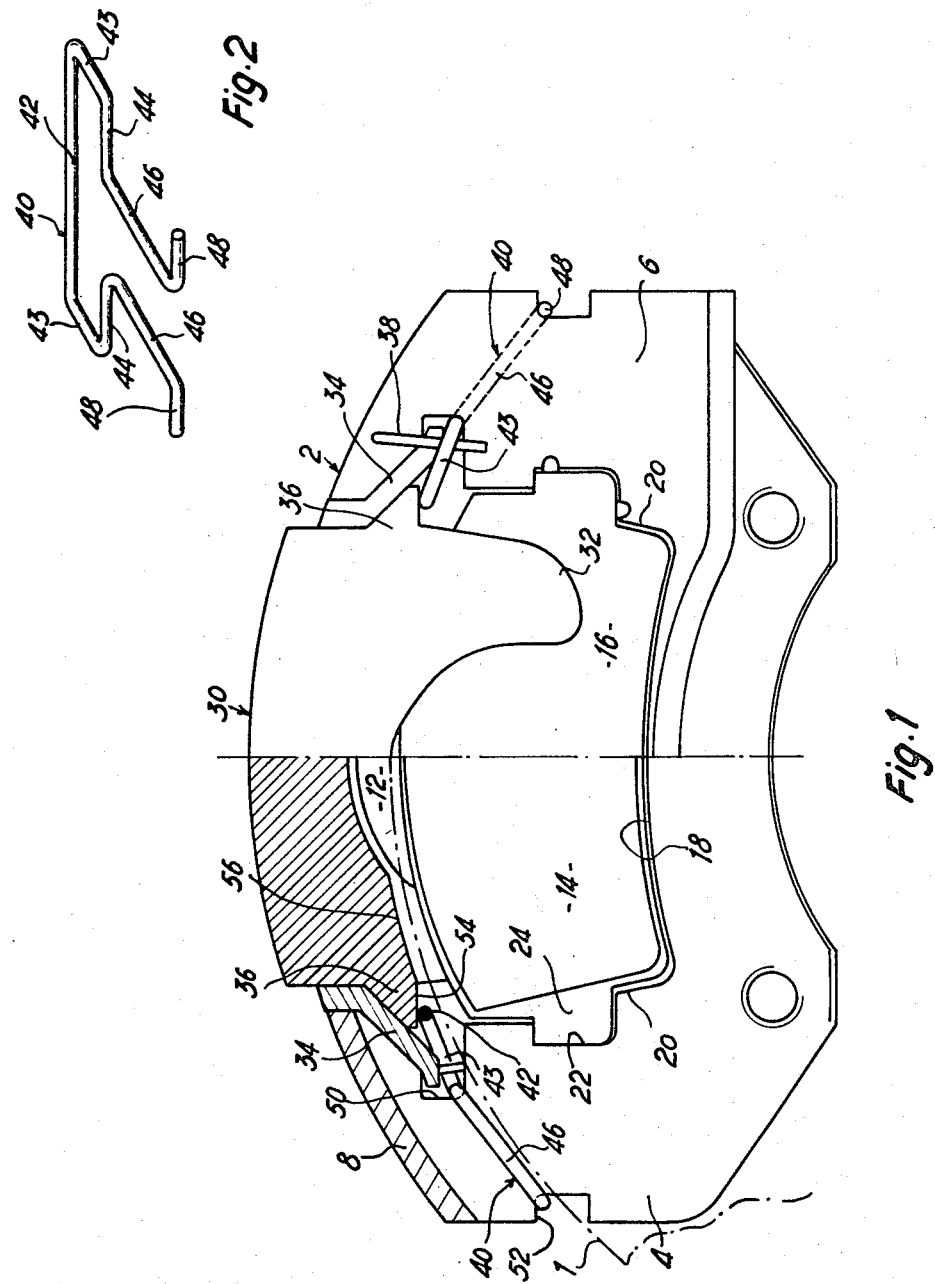

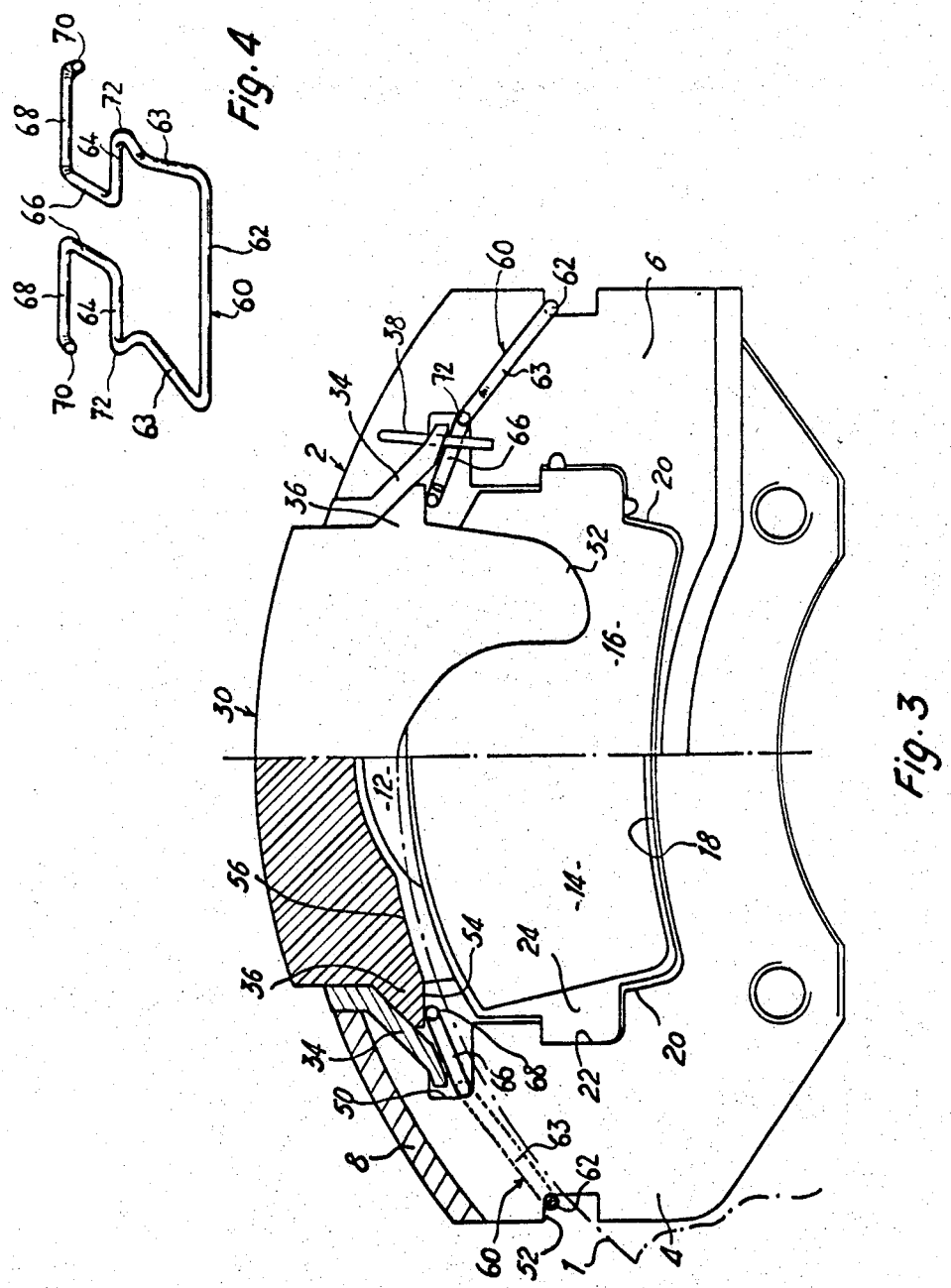

3,403,756
RESILIENT SUPPORTING MEANS FOR CALIPER-TYPE DISC BRAKE
René Thirion, Paris, France, assignor to
Societe Anonyme D.B.A.
Filed June 20, 1967, Ser. No. 647,540
Claims priority, application France, June 22, 1966, 66,426;
Dec. 30, 1966, 89,550
6 Claims. (Cl. 188—73)

ABSTRACT OF THE DISCLOSURE

A spot-type disc brake having a floating stirrup which is mounted in a recess formed in the limbs of a U-shaped fixed support and is guided in said recess by means of a pair of guide members located at the opposite ends of said recess he lateral edges of which are adapted to act as an anchor for a pair of friction pads located in the recess on opposite sides of the disc, said stirrup being urged radially outwardly toward the guide members by resilient means anchoring on the fixed support and consisting of wire springs.

Background of invention

In a spot-type disc brake of the kind referred to above, it is known from co-pending U.S. application Ser. No. 521,771, now Patent No. 3,368,647, same assignee, to form the floating stirrup with a pair of circumferentially-spaced portions and the lateral edges of the recess with projections extending circumferentially toward each other, and to insert between the fixed support and the peripheral portion of the stirrup a flexed leaf spring for resiliently urging the spaced portions of the latter toward the guide members which are interposed between said spaced portions and said projections. While operating satisfactorily, this construction still has the drawback that, the leaf spring being located in the space between the disc and the peripheral portion of the stirrup and having to be held at some distance from the edge of the disc in order to avoid overheating, the outer diameter of the disc must be reduced to a value substantially less than that which would allow the free rotational movement thereof.

Summary of the invention

Accordingly, it is an object of this invention to substitute resilient means located outside the space between the disc and the peripheral portion of the stirrup for those mentioned hereinabove, and thus to allow a disc of greater diameter to be used within a vehicle wheel of a given diameter and a higher braking efficiency to be achieved.

More specifically, it is an object of the present invention to provide resilient means each consisting of a spring wire having the general configuration of an open loop and comprising three sets of aligned bent portions disposed substantially parallel to the axis of the disc and circumferentially spaced apart from one another, two of said sets being received in respective notches provided in the limbs of the fixed support for anchoring thereon whereas the third one is adapted to resiliently engage the adjacent spaced portion of the stirrup.

Other objects and features of the invention will be apparent from the following description of two preferred embodiments taken in connection with the accompanying drawings.

Brief description of the drawings

FIGURE 1 is a lateral view of a disc brake according to the invention, the left half portion of which is a sectional view taken substantially along the plane of the disc;

FIGURE 2 is an isometric view of one of the wire springs used in the brake of FIGURE 1 to maintain the stirrup against its guiding key members;

FIGURE 3 shows a brake similar to the one of FIGURE 1 according to another embodiment;

FIGURE 4 is an isometric view of the wire spring used with the brake of FIGURE 3.

Description of the preferred embodiments

The spot-type disc brake of FIGURE 1 comprises a U-shaped fixed support 2 consisting of two limbs 4 and 6 which are connected by two peripheral portions 8 straddling the disc. In each of the limbs is provided a recess 12 opening toward the outside.

The recesses 12 provided to receive the friction pads 14 and 16 have a curvilinear base 18 and in the lateral edges 20 of said recesses are made cuttings 22 in which are inserted with a very small play the lateral extensions 24 of the adjacent friction pads. The edges of cuttings 22 just provide a guiding for the friction pads 14 and 16 during their displacements toward the disc and serve to transmit directly to the limbs 4 and 6 of the fixed support the reaction generated during braking.

The actuating mechanism of the brake comprises a stirrup, generally designated by reference numeral 30, which straddles the disc and the friction pads. Stirrup 30 is provided, on one side of the disc, with a hydraulic device the movable portion of which causes pad 14 to be applied against one face of the disc. The stirrup is terminated on the other side of the disc by a pair of spaced pressure portions 32 which, by reaction, apply pad 16 against the opposite face of the disc.

Stirrup 30 is maintained in engagement with circumferential projections of the fixed support 2 surrounding the recess 12 through the intermediary of two removable guide members 34 on which take abutment of the lateral edges 36 of the stirrup under the action of resilient means which will be described hereinafter.

Guide members 34 provide a guiding of the stirrup during the displacements thereof axially with respect to the disc; they are provided with holes receiving pins 38 provided to maintain the members locked against any axial movement.

The lateral edges 36 of the stirrup 30 are maintained in engagement with the respective guiding surfaces of the members 34 by respective resilient means each constituted by a wire spring 40 anchored on one of the elements of the fixed support 2 surrounding the recess 12. Said resilient means are provided to exert on the adjacent lateral edges of the stirrup a radially directed pressure toward the outside of the brake. As better shown in FIGURE 2, which depicts one of the springs 40 according to a first embodiment, said spring is made from a steel wire formed in the shape of a rectangular loop the larger side 42 of which constitutes the base of the loop whereas the opposite larger side is open and consists of two distinct portions 44 each of which is provided with a projection 46 bent at a right angle, said projection 46 being itself ended by a hook portion 48 bent outwardly at right angle. The distance between the projections 46 is chosen slightly smaller than the width between limbs 4 and 6 of the fixed support whereas the distance between the smaller sides 43 of the rectangular loop is chosen slightly larger than the axial length of the guide members 34. Furthermore, the length of projections 46 is such that the side portion 44 on the one hand and the hook portion 48 on the other hand are inserted without notable play during the mounting operation in two anchoring notches 50 and 52 respectively formed in the limbs of the fixed support. The length of the smaller sides 43 is chosen in such a manner that the base 42 of the loop is resiliently applied on a flat portion 54 provided underneath the adjacent lateral edge 36 of the stirrup.

The assembling of the brake is easily understood when considering the drawing of FIGURES 1 and 2. Friction pads 14 and 16 being mounted in the fixed support 2, the projections 46 of the springs 40 are inserted between the limbs 4 and 6 of said fixed support 2, said projections being pressed toward each other so that the engagement of their hook portions 48 be possible between limbs 4 and 6. Projections 46 having been released their respective ends enter notches 52 because of their resiliency when the spring 40 arrives at the wanted position. Then is mounted the stirrup 30 on which is exerted a pressure which is sufficient to resiliently move inwardly the bases 42 of the springs 40 on which are applied the lateral edges of the stirrup in order to create between this latter and the surrounding elements of the fixed support gaps into which are inserted to removable guide members 34.

When the guide members 34 have been inserted, the pressure exerted upon the stirrup is released and the next step consists in locking the key members by insertion of the pins 38 in the holes provided therefor. The dismounting of the brake is effected in a simple manner by repeating the above steps in the reverse order.

It should be noted that because of the distance between the smaller sides 43 of the loop this latter cannot interfere with the ends of the guide members nor with the pins thereof.

The springs 40 being anchored as explained above on the elements of the fixed support surrounding the recess, they are submitted to a resilient deformation because of the presence of the stirrup and the flexural and torsional reactions developing in the springs combine to generate a substantially radially directed pressure toward the outside of the recess. This pressure is applied by the bases 42 of the loops on the respective flat bearing portions 54 provided underneath the lateral edges 36 of the stirrup in order to maintain this latter in engagement with the guiding surfaces of the members 34.

It results from the above description that the resilient means of the present invention are totally located outside of the radial space extending between the inner peripheral portion 56 of the stirrup and the disc 1 which permits reducing such space in a substantial manner just enough to permit the free rotation of the disc this permitting increasing the diameter of this latter for a same size of the brake.

Furthermore, substituting the wire spring of the invention the base 42 of which engages the cooperating surface 54 of the stirrup along an axial line of contact for the bent leaf spring generally used in such brakes permits reducing substantially the friction between the stirrup and the fixed support which results in facilitating the displacements of the stirrup axially with respect to the disc.

Another advantage of the invention is due to the pressure exerted upon the stirrup being more uniformly distributed since the springs are made wider and act on more distant portions of the stirrup than in the brake of the prior art.

The disc brake shown in FIGURE 3 being substantially similar to the one of FIGURE 1, the elements constituting this brake have been designated by the same reference numerals except as regards the wire springs which are different as explained hereinafter.

As shown in FIGURE 4, the springs 60 used to maintain the stirrup 30 in engagement with the elements of the fixed support 2 surrounding the recess 12 through the intermediary of guide members 34 on which are applied the lateral edges 36 of the stirrup, comprise a trapezoidal loop of steel wire having a rectilinear base 62, two adjacent sides 63 bent from this base and converging one toward the other at their respective ends and a fourth side constituted by two distinct portions 64 parallel to the base 62. The two portions 64 are each provided with a projection 66 bent at a right angle and terminating by hook portion 68 also bent at right angle and advantageously bent itself at its end 70.

When mounting the brake, the springs 60 are set in place from the outside, the projections 66 thereof being pulled away from one another, and slipped along the external faces of the limbs 4 and 6 of the fixed support until the base 62 and the portions 64 respectively engage without any notable play the notches 52 and 50 provided in the limbs of the fixed support. The stirrup 30 and the guide members 34 are then mounted as hereinbefore with reference to FIGURES 1 and 2. The length of the projections 66 is chosen so that during the mounting operation the lateral edges 36 of the stirrup come in abutment against the two hook portions 68 of the spring to resiliently flex the latter, of course these portions 68 have a length which affords a good guiding of the stirrup during the axial displacements of the latter.

Of course the spring 60 could be designed in the form of a rectangular loop without departing from the spirit of the invention but the choice of the trapezoidal form results in advantages in that it permits a lateral locking of the spring, the sides 63 of which only bearing at a single point on the limbs of the fixed support. Such a punctual contact substantially reduces the friction faces and thus render easier the mounting and dismounting operations while permitting a free deformation of the springs. However, to avoid that such a contact occur along a ridge of the fixed support which could result in a lack of accuracy in positioning and in a damaging of the spring it appears advantageous to form each of the lateral sides 63 of the trapezoidal loop with an inwardly curved portion which is adapted to resiliently engage the outer face of the respective limb of the fixed support.

What we claim is:

1. A spot-type disc brake comprising a rotatable disc, a U-shaped fixed support having limbs straddling the disc, a pair of friction pads located on the opposite sides of the disc and mounted in said fixed support to take anchorage thereon upon engagement with the respective faces of the disc, an axially movable stirrup straddling said disc and friction pads and adapted to move the latter toward said faces of the disc upon actuation of actuating means located in one leg of said stirrup, said stirrup having a pair of circumferentially spaced portions, a recess located at the periphery of said fixed support and having two opposite circumferentially-spaced edges provided with projections extending circumferentially toward each other respectively, resilient means located between said fixed support and said stirrup to urge the latter radially outwardly toward the respective projections of said fixed support, said resilient means each consisting of a spring wire having the general configuration of an open loop and comprising three sets of aligned bent portions disposed substantially parallel to the axis of the disc and circumferentially-spaced apart from one another, two of said sets being received in respective notches provided in the limbs of the fixed support for anchoring thereon whereas the third one is adapted to resiliently engage the adjacent spaced portion of the stirrup.

2. A spot-type disc brake according to claim 1, wherein said resilient means each consist of a spring wire having the shape of a rectangular loop, one side of which is solid and resiliently engages the adjacent spaced portion of the stirrup whereas the opposite side consists of two aligned and distinct portions each provided with a projection bent substantially at a right angle and ending with a hook portion, said distinct portions and said hook portions engaging respective sets of anchoring notches formed in the limbs of the fixed support.

3. A spot-type disc brake according to claim 2, wherein said projections are substantially parallel to each other and extend at a distance slightly less than that between the two limbs of the fixed support so as to be resiliently engageable therebetween.

4. A spot-type disc brake according to claim 2, wherein said solid side of the loop is formed substantially longer than the distance between said limbs so as to project outwardly from each side of the fixed support and thus provide positive guiding of the stirrup.

5. A spot-type disc brake according to claim 1, wherein said resilient means each consist of a spring wire having the shape of a trapezoidal loop the two parallel sides of which engage respective sets of anchoring notches formed in the limbs of the fixed support, one of said parallel sides being solid and the other consisting of two aligned and distinct portions each provided with a projection bent substantially at a right angle and ending with a hook portion adapted to resiliently engage the adjacent spaced portion of the stirrup.

6. A spot-type disc brake according to claim 5, wherein the two other sides of said trapezoidal loop are each formed with an inwardly curved portion adapted to resiliently engage the outer surface of the respective limb of the fixed support.

References Cited

UNITED STATES PATENTS 3,265,160  8/1966  Elberg et al. _____ 188—73
3,368,647  2/1968  Laverdant _____ 188—73

MILTON BUCHLER, *Primary Examiner.*

G. E. A. HALVOSA, *Assistant Examiner.*